United States Patent
Yamada

(10) Patent No.: US 9,262,707 B2
(45) Date of Patent: Feb. 16, 2016

(54) IMAGE FORMING APPARATUS, IMAGE PROCESSING SYSTEM, AND COMPUTER PROGRAM PRODUCT

(75) Inventor: Kazuhiro Yamada, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 193 days.

(21) Appl. No.: 13/549,876

(22) Filed: Jul. 16, 2012

(65) Prior Publication Data

US 2013/0027726 A1    Jan. 31, 2013

(30) Foreign Application Priority Data

Jul. 29, 2011   (JP) .................... 2011-167102

(51) Int. Cl.
*G06K 15/02*   (2006.01)
*G06K 15/00*   (2006.01)

(52) U.S. Cl.
CPC ............ *G06K 15/405* (2013.01); *G06K 15/005* (2013.01)

(58) Field of Classification Search
CPC ... G06F 3/1285; G06F 3/1288; G06F 3/1454; G06F 21/305; H04N 1/0035; H04N 1/00464; H04N 1/00474; H04N 4/00204; H04N 2201/0094; G06K 15/405; G06K 15/005
USPC ............................................. 358/1.13, 1.15
See application file for complete search history.

(56) References Cited

U.S. PATENT DOCUMENTS

| 8,132,107 B2 | 3/2012 | Honma |
| 8,947,699 B2 | 2/2015 | Ito |
| 2006/0077423 A1* | 4/2006 | Mathieson et al. .......... 358/1.15 |
| 2006/0077444 A1* | 4/2006 | Lum et al. .................... 358/1.15 |
| 2009/0296150 A1* | 12/2009 | Shudo .......................... 358/1.15 |
| 2012/0050780 A1* | 3/2012 | Osawa ......................... 358/1.13 |

FOREIGN PATENT DOCUMENTS

| JP | 2007-304881 A | 11/2007 |
| JP | 2007-323366 A | 12/2007 |
| JP | 2009-181345 A | 8/2009 |
| JP | 2009-267974 A | 11/2009 |
| JP | 2009-278387 A | 11/2009 |
| JP | 2010-115809 A | 5/2010 |
| JP | 2010-158777 A | 7/2010 |
| JP | 2011-119939 A | 6/2011 |

* cited by examiner

Primary Examiner — Kent Yip
(74) Attorney, Agent, or Firm — Harness, Dickey & Pierce, PLC

(57) ABSTRACT

An image forming apparatus has a display device and a mechanically-configured operating unit, and enables use of a function implemented in an information processing apparatus via a network. The image forming apparatus includes: a remote function-displaying unit that obtains display information to display a visual interface of the function implemented in the information processing apparatus to display the visual interface on the display device; a remote operating unit that sends operation information indicating contents of an operation on the display screen to the information processing apparatus; and a mechanical operation detecting unit that obtains contents of an operation on the mechanically-configured operating unit. When the visual interface of the function implemented in the information processing apparatus is being displayed on the display device, the mechanical operation detecting unit sends mechanical operation information indicating the contents of the operation on the mechanically-configured operating unit to the information processing apparatus.

6 Claims, 7 Drawing Sheets

| HARDWARE KEY NAME | IDENTIFIER |
|---|---|
| START | xxxxxx |
| RESET | xxxxxx |
| CLEAR | xxxxxx |
| #1 | xxxxxx |
| #2 | xxxxxx |
| #3 | xxxxxx |
| #4 | xxxxxx |
| ⋮ | |

FIG.9

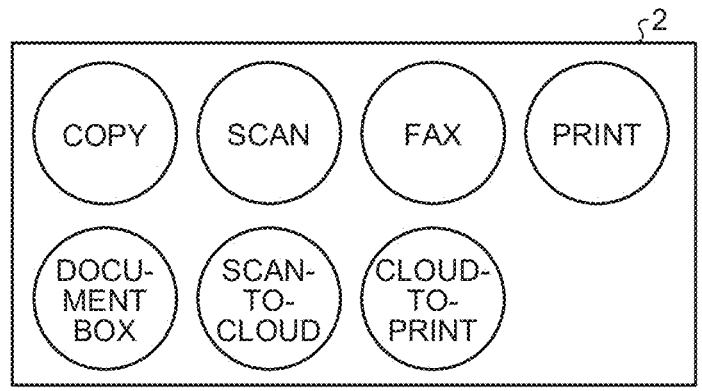

FIG.10

| REGISTERED-APPLICATION NAME | RUNNING APPLICATION | HARDWARE-KEY-OPERATION NOTIFICATION DESTINATION |
|---|---|---|
| COPY | COPYING APPLICATION | COPYING APPLICATION |
| SCAN | SCANNING APPLICATION | SCANNING APPLICATION |
| FAX | FAXING APPLICATION | FAXING APPLICATION |
| PRINT | PRINTING APPLICATION | PRINTING APPLICATION |
| DOCUMENT BOX | DOCUMENT BOX APPLICATION | DOCUMENT BOX APPLICATION |
| SCAN-TO-CLOUD | RDP CLIENT APPLICATION | ADDITIONAL FUNCTION PROCESSING APPARATUS |
| CLOUD-TO-PRINT | RDP CLIENT APPLICATION | ADDITIONAL FUNCTION PROCESSING APPARATUS |
| ⋮ | | |

IMAGE FORMING APPARATUS, IMAGE
PROCESSING SYSTEM, AND COMPUTER
PROGRAM PRODUCT

CROSS-REFERENCE TO RELATED
APPLICATIONS

The present application claims priority to and incorporates by reference the entire contents of Japanese Patent Application No. 2011-167102 filed in Japan on Jul. 29, 2011.

BACKGROUND OF THE INVENTION

1. Field of the Invention

The present invention relates to an image forming apparatus, an image processing system, and a computer program product; and particularly relates to an operation operating an information processing apparatus, which is provided for the purpose of adding a function to the image forming apparatus, via an operating unit of the image forming apparatus.

2. Description of the Related Art

In recent years, there is a trend for promoting digitization of information. Hence, image processing apparatuses, such as a printer or a facsimile machine used to output digitized information, or a scanner used to digitize a document have become indispensable. Such an image processing apparatus is often equipped with the imaging function, the image forming function, the communication function, etc.; and are thus configured as a multifunction peripheral that can be used as a printer, a facsimile machine, a scanner, and a copying machine.

In order to equip such an image processing apparatus with various functions, the image processing apparatus is typically integrated with an information processing apparatus, and the function provided by the information processing apparatus is combined with the function implemented by the image processing apparatus. Thus, for example, an information processing apparatus performs optical character recognition (OCR) on an image generated by means of scanning in an image processing apparatus, or an information processing apparatus stores an image, which is generated by means of scanning in an image processing apparatus, in a memory area provided over a network.

In such an image processing apparatus integrated manner with an information processing apparatus; a user interface such as a hardware key and a display panel is connected to the information processing apparatus so that the image processing apparatus is controlled from the information processing apparatus.

On the other hand, as a method to control the information processing apparatus from the image processing apparatus, a method of using a remote desktop function is already known (for example, see Japanese Patent Application Laid-open No. 2007-304881).

In a configuration in which an image processing apparatus and an information processing apparatus are configured in an integrated manner, the image processing apparatus and the information processing apparatus are paired on a one-to-one basis. However, from the perspective of efficient use of hardware resources, it is desirable that a single information processing apparatus is installed against a plurality of image processing apparatuses, and that the single information processing apparatus can operate in tandem with the image processing apparatuses. In this case, the image processing apparatuses are installed at different locations. Hence, unlike the typical configuration, a configuration in which an operating unit is connected to the information processing apparatus is hard to be adopted and an operating unit connected to the image processing apparatuses is preferably adopted.

If the technology disclosed in Japanese Patent Application Laid-open No. 2007-304881 is used, it becomes possible to operate the information processing apparatus using the operating unit connected to the image processing apparatus. However, in the case of using the remote desktop function, signals that can be communicated with the information processing apparatus are limited to only operation signals regarding screens, that is, operation signals caused by touching the display panel.

Therefore, when the information processing apparatus is controlled using the remote desktop function, it is neither possible to perform the operation using the hardware key nor to perform light emitting control of a light emitting diode (LED) that is installed in the operating unit. Thus, in a system in which the image processing apparatus and the information processing apparatus operate in tandem, if the operating unit that is connected to the image processing apparatus is used, it becomes difficult to make use of all functions of the operating unit when controlling the function implemented by the image processing apparatus and the information processing apparatus in tandem.

There is a need to enable, in a system in which an image processing apparatus and an information processing apparatus operate in tandem, use of all functions of the operating unit even when controlling a function implemented by the image processing apparatus and the information processing apparatus in tandem and using an operating unit connected to the image processing apparatus.

SUMMARY OF THE INVENTION

It is an object of the present invention to at least partially solve the problems in the conventional technology.

An image forming apparatus has a display device, which enables input of information by performing operation on a display screen thereof, and a mechanically-configured operating unit, and enables use of a function implemented in a separately-provided information processing apparatus via a network. The image forming apparatus includes: a remote function-displaying unit that obtains display information to display a visual interface of the function implemented in the information processing apparatus, and that displays the visual interface on the display device; a remote operating unit that, according to an operation on the display screen displaying the visual interface, sends operation information indicating contents of the operation to the information processing apparatus; and a mechanical operation detecting unit that obtains contents of an operation on the mechanically-configured operating unit. When the visual interface of the function implemented in the information processing apparatus is being displayed on the display device and the mechanical operation detecting unit obtains the contents of the operation on the mechanically-configured operating unit, the mechanical operation detecting unit sends mechanical operation information indicating the obtained contents of the operation to the information processing apparatus.

An image processing system includes: an information processing apparatus that has an image processing function; and an image processing apparatus that has a display device, which enables input of information by performing an operation on a display screen thereof, and a mechanically-configured operating unit, and that enables use of a function implemented in the information processing apparatus via a network. The image forming apparatus includes a remote function-displaying unit that obtains display information to display a visual interface of the function implemented in the information processing apparatus, and that displays the visual interface on the display device; a remote operating unit that, according to an operation on the display screen displaying the visual interface, sends operation information indicating contents of the operation to the information processing apparatus; and a mechanical operation detecting unit that obtains contents of an operation on the mechanically-configured operating unit. When the visual interface of the function implemented in the information processing apparatus is being displayed on the display device and the mechanical operation detecting unit obtains the contents of the operation on the mechanically-configured operating unit, the mechanical operation detecting unit sends mechanical operation information indicating the obtained contents of the operation to the information processing apparatus. The information processing apparatus includes a remote display-providing unit that sends the display information to display the visual interface of the function implemented in the information processing apparatus, to the image forming apparatus in response to a request from the remote function-displaying unit; and a remote operation-receiving unit that inputs an operation signal, based on the operation information received from the remote operating unit, to the function implemented in the information processing apparatus and that inputs an operation signal, based on the mechanical operation information received from the mechanical operation detecting unit, to the function implemented in the information processing apparatus.

A computer program product includes a non-transitory computer-usable medium having computer-readable program codes of a control program of an image forming apparatus that has a display device, which enables input of information by performing operation on a display screen thereof, and a mechanically-configured operating unit, and that enables use of a function implemented in a separately-provided information processing apparatus via a network. The program codes when executed causing a computer to execute: a step of displaying that includes obtaining display information to display a visual interface of the function implemented in the information processing apparatus, and displaying the visual interface on the display apparatus; a step of sending, according to an operation on the display screen displaying the visual interface, operation information indicating contents of the operation to the information processing apparatus; a step of obtaining contents of an operation on the mechanically-configured operating unit; and a step of sending, when the visual interface of the function implemented in the information processing apparatus is being displayed on the display device and the contents of the operation on the mechanically-configured operating unit are obtained, mechanical operation information indicating the obtained contents of the operation to information processing apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a diagram illustrating a function selection screen that is displayed on a display panel of the image forming apparatus according to the embodiment of the present invention;

FIG. 10 is a diagram illustrating an application registration table according to the embodiment of the present invention;

DETAILED DESCRIPTION OF THE PREFERRED EMBODIMENTS

An embodiment of the present invention is described below with reference to the accompanying drawings. In the present embodiment, explanation is given for an example of an image processing system in which an image processing apparatus and an information processing apparatus are operated in tandem with the aim of implementing additional functions in the image processing apparatus, and in which applications installed in an information processing apparatus can be operated using an operating unit that is connected to the image processing apparatus.

Figure 1:
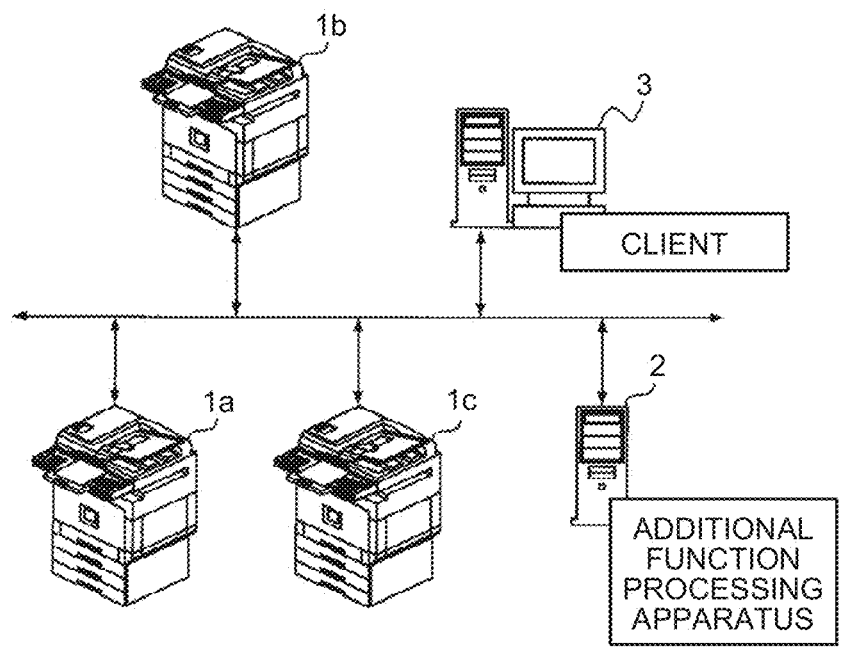
FIG. 1 is a diagram illustrating an operating configuration of a system according to an embodiment of the present invention.

As illustrated in FIG. 1, a system according to the present embodiment is caused to function by connecting a plurality of image forming apparatuses 1a, 1b, and 1c (hereinafter, collectively referred to as "image forming apparatus 1"), an additional function processing apparatus 2, and a client terminal 3 to each other via a network. In FIG. 1, the network that connects the abovementioned equipments is, for example, a local area network (LAN) installed in an office.

The image forming apparatus 1 is equipped with an imaging function, an image forming function, and a communication function; and is thus configured as a multifunction peripheral (MFP) that can be used as a printer, a facsimile machine, a scanner, and a copying machine. In the present embodiment, the image forming apparatus 1 operates in tandem with the additional function processing apparatus 2, and thereby can make use of a function that is implemented by an application installed in the additional function processing apparatus 2.

The additional function processing apparatus 2 serves as an information processing apparatus to realize an information processing function in cooperative processing with the image forming apparatus 1 and that performs processing according to the application installed therein. Moreover, in the present embodiment, the additional function processing apparatus 2 has a function of a remote desktop protocol (RDP) server to receive operation signals from the image forming apparatus 1, and has a function to make use of functions of the operating unit that is connected to the image forming apparatus 1. This is one of key points of the present embodiment. Meanwhile, the client terminal 3 is an information processing terminal that is operated by the user, and is put into practice using a personal computer (PC) or the like.

Figure 2:
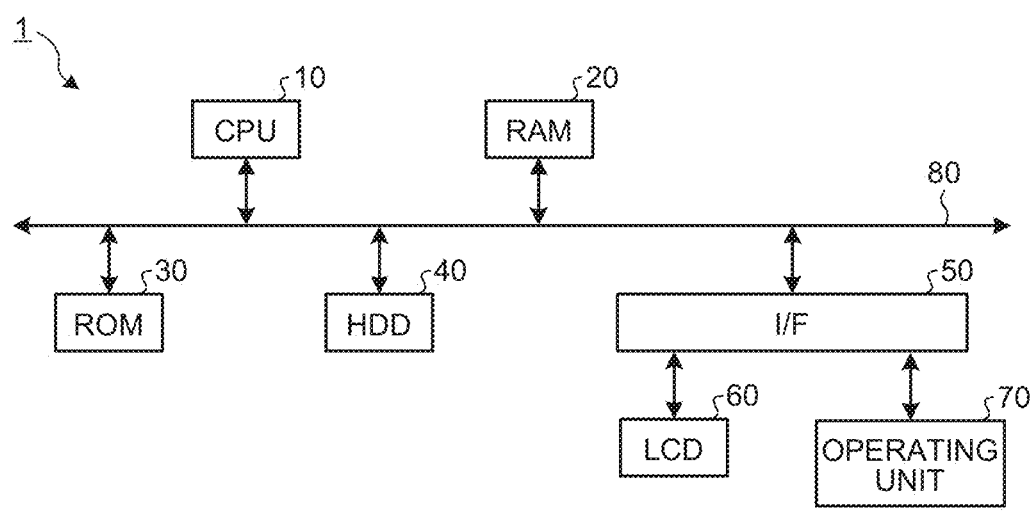
FIG. 2 is a block diagram schematically illustrating a hardware configuration of an image forming apparatus according to the embodiment of the present invention.

Explained below with reference to FIG. 2 is a hardware configuration of the image forming apparatus 1, the additional function processing apparatus 2, and the client terminal 3. Regarding the image forming apparatus 1, in addition to the hardware configuration illustrated in FIG. 2, the image forming apparatus 1 also includes an engine to serve as a scanner and a printer. In the following description, although the hardware configuration of only the image forming apparatus 1 is explained as an example, the same example also applies to the other apparatuses.

As illustrated in FIG. 2, the image forming apparatus 1 according to the present embodiment has a configuration like a commonly-used server, a commonly-used PC or the like. That is, in the image forming apparatus 1 according to the present embodiment; a central processing unit (CPU) 10, a random access memory (RAM) 20, a read only memory (ROM) 30, a hard disk drive (HDD) 40, and an interface (I/F) 50 are connected to each other via a bus 80. Moreover, to the I/F 50 are connected a liquid crystal display (LCD) 60 and an operating unit 70.

The CPU 10 is a computing unit that controls the overall operations of the image forming apparatus 1. The RAM 20 is a volatile memory medium that allows high-speed reading and writing, and is used as a work memory by the CPU 10 while processing information. The ROM 30 is a read-only type nonvolatile memory medium in which computer programs such as firmware are stored. The HDD 40 is a nonvolatile memory medium that allows reading and writing of information, and is used to store the operating system (OS), various control programs, and various application programs.

The I/F 50 enables establishing connection between the bus 80 and various hardware components or a network, and controls the connection. The LCD 60 is a visual user interface that enables a user to check the state of the image forming apparatus 1. The operating unit 70 is a user interface such as a keyboard or a mouse that enables the user to input information to the image forming apparatus 1. In the present embodiment, the operating unit 70 of the image forming apparatus 1 includes a display panel that is used to display an operating screen as a graphical user interface (GUI); a hardware key that is installed to enable general-purpose information input; and an LED to notify the user of a state of the image forming apparatus 1.

With such a hardware configuration, a computer program that is stored in a memory medium such as the ROM 30, the HDD 40, or an optical disk (not illustrated) is loaded into the RAM 20. Then, according to the computer program loaded into the RAM 20, the CPU 10 performs operations so that a software control unit is established. With a combination of the software control unit established in this way and a hardware component, a functional block gets configured that enables implementation of a function of the image forming apparatus 1 according to the present embodiment.

Figure 3:
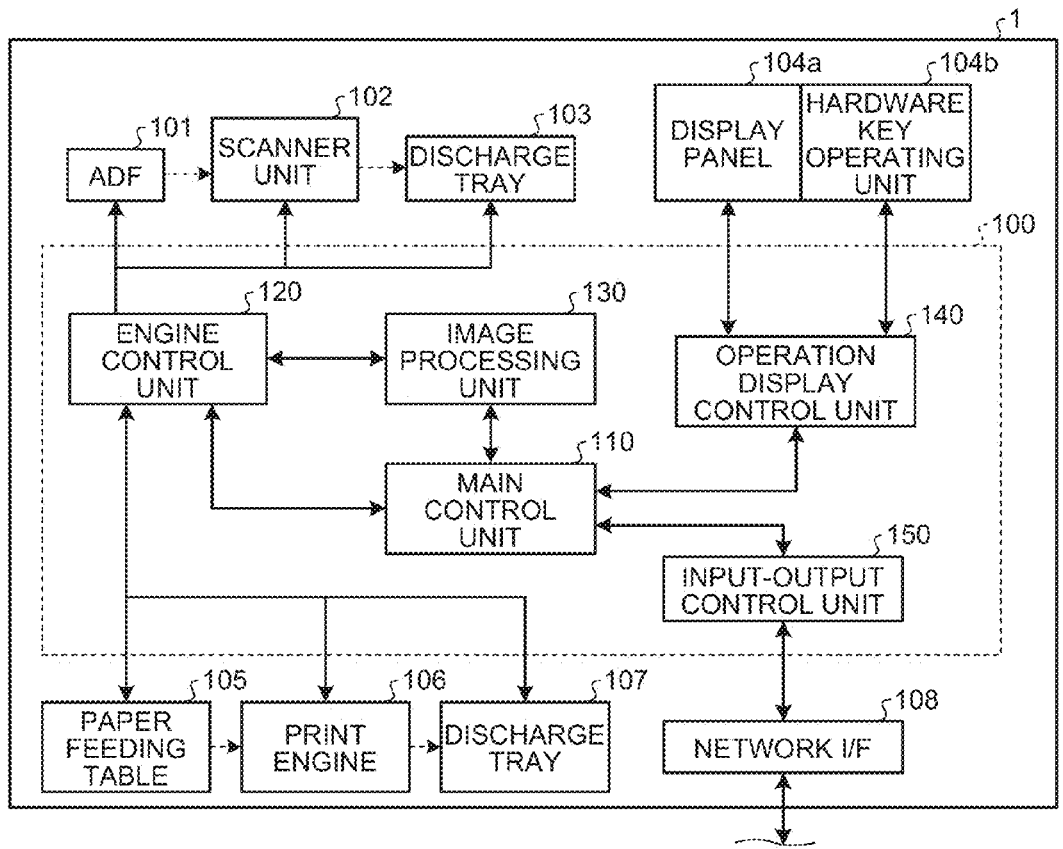
FIG. 3 is a block diagram of a functional configuration of the image forming apparatus according to the embodiment of the present invention.

Explained below with reference to FIG. 3 is a functional configuration of the image forming apparatus 1 according to the present embodiment. FIG. 3 is a block diagram of a functional configuration of the image forming apparatus 1 according to the present embodiment. As illustrated in FIG. 3, the image forming apparatus 1 according to the present embodiment includes a controller 100, an auto document feeder (ADF) 101, a scanner unit 102, a discharge tray 103, a display panel 104a, a hardware key operating unit 104b, a paper feeding table 105, a print engine 106, a discharge tray 107, and a network I/F 108.

Further, the controller 100 includes a main control unit 110, an engine control unit 120, an image processing unit 130, an operation display control unit 140, an input-output control unit 150, and a document storing unit 160. As illustrated in FIG. 3, the image forming apparatus 1 according to the present embodiment is configured to be a multifunction peripheral including the scanner unit 102 and the print engine 106. Meanwhile, in FIG. 3, electrical connection is illustrated with a solid-line arrow, while a flow of a paper sheet is illustrated with a dashed-line arrow.

The display panel 104a serves as an output interface that visually displays the state of the image forming apparatus 1. Besides, the display panel 104a also serves as a touch panel used as an input interface using which the user can directly operate the image forming apparatus 1 or input information to the image forming apparatus 1. Thus, the display panel 104a is equipped with a function of displaying an image to receive a user operation. The hardware key operating unit 104b is a mechanically-configured operating unit that includes hardware keys that are pressed to input general-purpose information such as a "start" key that is pressed to instruct a start of copying or scanning or a numerical keypad that is pressed to input numbers from 0 to 9; and LEDs that notify the user of the keys which can be pressed. The display panel 104a and the hardware key operating unit 104b are respectively put into practice using the LCD 60 and the operating unit 70 illustrated in FIG. 2.

The network I/F 108 serves as an interface that enables the image forming apparatus 1 to communicate with other devices such as the client terminal 3 and the additional function processing apparatus 2. As the network I/F 108, an Ethernet (registered trademark) interface or a universal serial bus (USB) interface is used. The network I/F 108 can perform communication using the TCP/IP protocol. Moreover, when the image forming apparatus 1 serves as a facsimile machine, the network I/F 108 serves also as an interface to perform facsimile transmission. For that reason, the network I/F 108 is also connected to a telephone line. Herein, the network I/F 108 is put into practice using the I/F 50 illustrated in FIG. 2.

The controller 100 is configured by a combination of software and hardware. More specifically, a control unit 100 gets configured with a software control unit established by loading a computer program that is stored in the ROM 30, a nonvolatile memory, the HDD 40, or a nonvolatile memory medium such as an optical disk (not illustrated) into a volatile memory such as the RAM 20 (hereinafter, referred to as "memory") and then performing operations by the CPU 10 according to that computer program, and a hardware component such as an integrated circuit. The controller 100 serves as a control unit to control overall operations of the image forming apparatus 1.

The main control unit 110 fulfills a role of controlling each unit included in the controller 100, and issues a command to each unit of the controller 100. The engine control unit 120 fulfills a role of a driving unit to control or drive the print engine 106 and the scanner unit 102. The image processing unit 130 operates under the control of the main control unit 110 and generates drawing information based on information on an image to be printed. The drawing information represents the information that is used by the print engine 106, which serves as an image forming unit, to draw an image to be formed during an image forming operation.

The image processing unit 130 processes imaging data that is input from the scanner unit 102, and generates image data. This image data is information that is, as a result of performing a scanner operation, either stored in a memory area of the image forming apparatus 1 or is transmitted to another information processing terminal or another memory device.

The operation display control unit 140 performs information display on the display panel 104a, lighting control of LEDs installed in the hardware key operating unit 104b, and so on, and notifies the main control unit 110 of information input via the display panel 104a and the hardware key operating unit 104b. The input-output control unit 150 inputs, to the main control unit 110, information that has been input through the network I/F 108. The main control unit 110 controls the input-output control unit 150 and accesses, through the network I/F 108 and via the network, the additional function processing apparatus 2 and other devices connected to the network.

When the image forming apparatus 1 serves as a printer; firstly, the input-output control unit 150 receives a print job through the network I/F 108. Then, the input-output control unit 150 transfers the received print job to the main control unit 110. Upon receiving the print job, the main control unit 110 controls the image processing unit 130 and causes the image processing unit 130 to generate drawing information based on the document information or image information included in the print job.

Once the drawing information is generated by the image processing unit 130; the engine control unit 120 controls the print engine 106 in such a way that, based on the drawing information that has been generated in the above, the print engine 106 performs image formation on the paper sheet fed from the paper feeding table 105. Thus, the image processing unit 130, the engine control unit 120, and the print engine 106 serve as an image forming/output unit. As a specific configuration of the print engine 106, it is possible to use an ink-jet image forming mechanism or an electrophotographic image forming mechanism. Meanwhile, a document that is obtained as a result of the image formation by the print engine 106 is discharged to the discharge tray 107.

When the image forming apparatus 1 serves as a scanner, in response to a scan execution instruction that is input by the user by operating the display panel 104a or the hardware key operating unit 104b, or is input from another terminal such as the client terminal 3 through the network I/F 108; the operation display control unit 140 or the input-output control unit 150 transfers a scan execution signal to the main control unit 110. Then, based on the received scan execution signal, the main control unit 110 controls the engine control unit 120.

The engine control unit 120 drives the ADF 101 to convey a original to be imaged, which is set in the ADF 101, to the scanner unit 102. Moreover, the engine control unit 120 drives the scanner unit 102 and performs imaging of the original conveyed from the ADF 101. If the original is not set in the ADF 101 but is directly set in the scanner unit 102, then the scanner unit 102 performs imaging of that original under the control of the engine control unit 120. Thus, the scanner unit 102 serves as an imaging unit, while the engine control unit 120 serves as a reading control unit.

During an imaging operation, an imaging element such as a charge-coupled device (CCD) installed in the scanner unit 102 optically scan an original. As a result, imaging information gets generated based on optical information. The engine control unit 120 transfers the imaging information, which is generated by the scanner unit 102, to the image processing unit 130. Then, under the control of the main control unit 110, the image processing unit 130 generates image information based on the imaging information received from the engine control unit 120.

The main control unit 110 obtains the image information generated by the image processing unit 130 and stores it in a memory medium installed in the multifunctional peripheral 1 such as the HDD 40. Thus, the scanner unit 102, the engine control unit 120, and the image processing unit 130 operate in tandem as an image input unit. According to an user instruction, the image information that is generated by the image processing unit 130 is either stored in the HDD 40 or the like or is transmitted to an external apparatus such as the additional function processing apparatus 2 or the client terminal 3 through the input-output control unit 150 and the network I/F 108.

When the image forming apparatus 1 serves as a copying machine, the image processing unit 130 generates drawing information based on the imaging information that is received by the engine control unit 120 from the scanner unit 102 or based on the image information generated by the image processing unit 130. Then, based on the drawing information, the engine control unit 120 drives the print engine 106 like in a printing operation. Meanwhile, if the drawing information and the imaging information are in the same information format, the imaging information can be used as drawing information without modification.

According to the present embodiment, the image forming apparatus 1 communicates information with the additional function processing apparatus 2 and implements a function that is installed in the additional function processing apparatus 2. For example, in order to store the image information, which is generated by scanning, in a file server of a cloud system provided through a network; the image forming apparatus 1 sends the image information as well as a store request to the additional function processing apparatus 2. Moreover, in order to display a list of image information, which is stored in a cloud system, on the display panel 104a and to enable printing of that image information; the image forming apparatus 1 issues a get request to obtain the list of image information to the additional function processing apparatus 2. Then, the image forming apparatus 1 receives the list of image information obtained by and transferred from the additional function processing apparatus 2 and displays that list on the display panel 104a.

Figure 4:
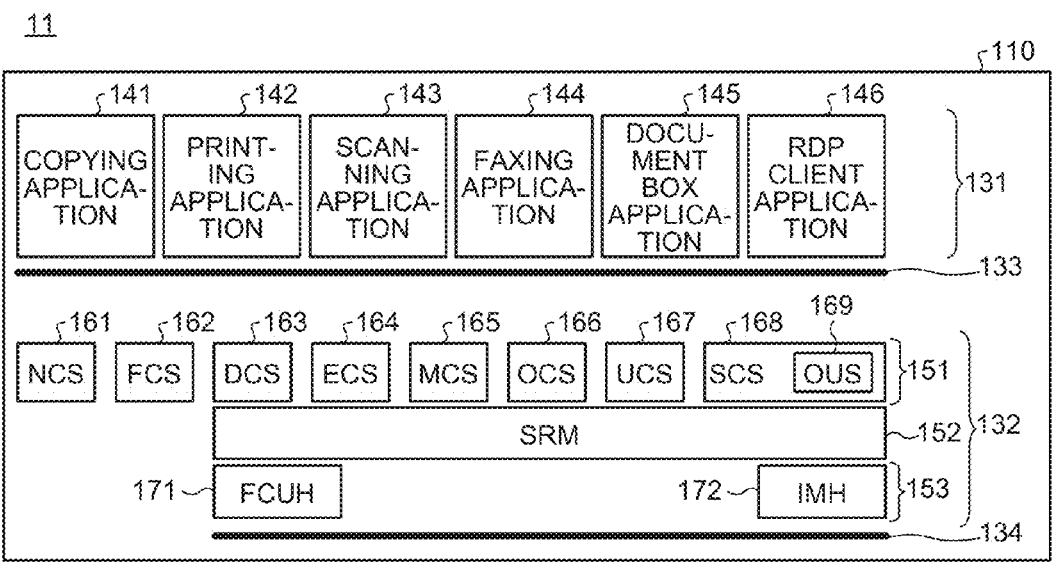
FIG. 4 is a diagram illustrating a software configuration according to the embodiment of the present invention.

Explained below with reference to FIG. 4 is a software configuration of the main control unit 110 designed for the purpose of implementing the abovementioned functions of the image forming apparatus 1. As illustrated in FIG. 4, various applications 131 and platform 132 are included in the software configuration of the main control unit 110. The applications 131 and the platform 132 are executed in parallel and in units of process by an OS such as UNIX (registered trademark). Each of the applications 131 represents the software used to perform information processing unique to one of the functions of the multifunctional peripheral 11.

The applications 131 include a copying application 141 written for a copying machine, a printing application 142 written for a printer, a scanning application 143 written for a scanner, a faxing application 144 written for facsimile, a document box application 145 that provides a function of storing a scanning result into the additional function processing apparatus 2, and an RDP client application 146 that provides the remote desktop protocol (RDP) function to enable operations of the additional function processing apparatus 2 via the image forming apparatus 1.

The platform 132 is software to perform information processing related to a processing request issued from the applications 131 to the various hardware components such as the display panel 104a and the network I/F 108. For the purpose of receiving a processing request from the applications 131, an application programming interface (API) 133 is used in which the processing request is received using a predefined function. For the purpose of issuing a processing request to the hardware component, an engine interface (ENI) 134 is used in which the processing request is issued using a predefined function.

The platform 132 includes various control services 151, a system resource manager (SRM) 152, and various handlers 153. The control services 151 interpret the processing request issued from the applications 131 to the hardware components, and generate a use request to use a hardware component according to a result of interpretation.

The control services 151 include a network control service (NCS) 161, a facsimile control service (FCS) 162, a delivery control service (DCS) 163, an engine control service (ECS) 164, a memory control service (MCS) 165, an operation control service (OCS) 166, a user directory control service (UCS) 167, a system control service (SCS) 168, and an on-demand update service (OUS) 169.

The process of the NCS 161 provides an API to perform data communication via a network or the like. A process of the FCS 162 provides an API to perform image data communication, image data obtaining, image data printing, etc. as a facsimile machine. A process of the DCS 163 performs control related to distribution of document data stored in the multifunctional peripheral 11. A process of the ECS 164 performs control related to the engine of an imaging unit 121 or a printing unit 122. A process of the MCS 165 performs control related to a memory or a hard disk drive such as image data storing and image data processing. A process of the OCS 166 performs control related to the display panel 104a and the hardware key operating unit 104b.

A process of the UCS 167 performs control related to management of user information. A process of the SCS 168 performs control related to system management. A process of the OUS 169 performs control related to computer program update. The SRM 152 arbitrates between use requests to use the hardware component and, according to an arbitration result, performs control to implement a processing request with respect to the hardware component. More particularly, A process of the SRM 152 determines whether or not a hardware component related to a use request is usable (i.e., whether or not another use request competes for that hardware component). If the hardware component is usable, the process of the SRM 152 notifies the control services 151 of this. Moreover, the process of the SRM 152 creates a usage schedule for the hardware component related to the use request, and performs control to implement processing requests with respect to the hardware component according to the usage schedule.

The handlers 153 manage the hardware component according to an arbitration result mentioned above. The handlers 153 include a facsimile control unit handler (FCUH) 171 and an image memory handler (IMH) 172. The FCUH 171 manages a facsimile control unit. The IMH 172 allocates memory to each process, and manages each memory to which a process is allocated. A multifunctional peripheral starting unit 113 is run initially when the power of the multifunctional peripheral 101 is switched ON. As a result, an OS such as UNIX (registered trademark) is started, and the applications 131 and the platform 132 are started.

Figures 5, 6:
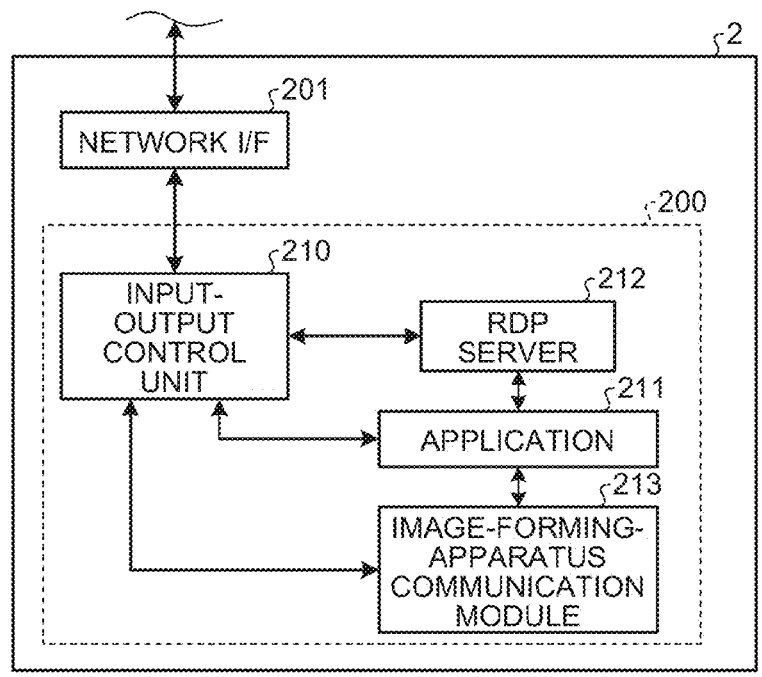
FIG. 5 is a diagram illustrating a hardware key identification table according to the embodiment of the present invention.
FIG. 6 is a block diagram illustrating a functional configuration of an additional function processing apparatus according to the embodiment of the present invention.

FIG. 5 is a diagram illustrating a table held by the OCS 166 according to the present embodiment. The table illustrated in FIG. 5 is a table (hereinafter, referred to as "hardware key identification table") that is used by the image forming apparatus 1 for the purpose of communicating contents of operation or control performed with respect to the hardware key operating unit 104b to the additional function processing apparatus 2. In the hardware key identification table, as illustrated in FIG. 5, hardware key name of each hardware key installed in the hardware key operating unit 104b is associated with an identifier used to identify that hardware key.

Upon detecting a user operation performed with respect to the hardware key 104b via the operation display control unit 140, the OCS 166 refers to the hardware key identification table and obtains the identifier of the hardware key that has been operated. Meanwhile, the information regarding identifiers included in the hardware key identification table is also registered in the additional function processing apparatus 2. Thus, by communicating the identifier obtained in the manner above described, the image forming apparatus 1 and the additional function processing apparatus 2 can perform an action in response to an operation to the hardware key operating unit 104b and control of the hardware key operating unit 104b in tandem.

Explained below with reference to FIG. 6 is a functional configuration of the additional function processing apparatus 2 according to the present embodiment. As illustrated in FIG. 6, the additional function processing apparatus 2 according to the present embodiment includes a controller 200 and a network I/F 201. The controller 200 includes an input-output control unit 210, an application 211, an RDP server 212, and an image-forming-apparatus communication module 213.

The network I/F 201 serves as an interface through which the additional function processing apparatus 2 can communicate with other apparatuses such as the image forming apparatus 1 and the client terminal 3 via a network. As the network I/F 201, an Ethernet (registered trademark) interface or a USB interface is used.

The controller 200 is configured with a combination of software and hardware. More specifically, a control unit 200 gets configured with a software control unit established by loading a computer program that is stored in a memory medium such as the ROM 30, a nonvolatile memory, the HDD 40, or a nonvolatile memory medium such as an optical disk into a volatile memory such as the RAM 20 (hereinafter, referred to as "memory") and then performing operations by the CPU 10 according to that computer program, and a hardware component such as an integrated circuit. The controller 200 serves as a control unit to control overall operations of the additional function processing apparatus 2.

The input-output control unit 210 controls network communication performed through the network I/F 201. Moreover, the input-output control unit 210 has a function of monitoring unauthorized access or a virus coming from the Internet and maintaining a secure state. The application 211 is a software module to implement an additional function by operating in tandem with the image forming apparatus 1. Explained below with reference to FIG. 7 is the function implemented by the application 211 according to the present embodiment.

Figure 7:
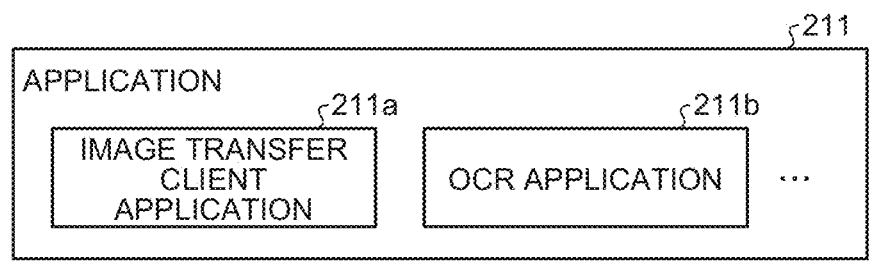
FIG. 7 is a diagram illustrating contents of an application according to the embodiment of the present invention.

As illustrated in FIG. 7, according to the present embodiment, the application 211 installed in the additional function processing apparatus 2 includes an image transfer client application 211a and an optical character recognition (OCR)

application 211b. The image transfer client application 211a provides a function by which the image information generated in the image forming apparatus 1 by means of scanning is stored in a file server of a cloud system provided through a network (hereinafter, referred to as "scan-to-cloud function"), a function by which image information stored in a file server of a cloud system is obtained and sent as a print job to the image forming apparatus 1 (hereinafter, referred to as cloud-to-print function"), etc. The OCR application 211b provides a function by which a character represented by an image included in the image information, which is generated in the image forming apparatus 1 by means of scanning, is recognized, and character information is generated.

The RDP server 212 is a module to implement the remote desktop function, and communicates information with the RDP client application 146 running in the image forming apparatus 1. When the remote desktop function is enabled, the RDP server 212 sends image information of a graphical user interface (GUI) provided by the application 211 to the image forming apparatus 1 in which the RDP client application 146 is running.

Moreover, the RDP server 212 obtains, from the image forming apparatus 1 and via the network, information indicating contents of an operation on the display panel 104a and detected by the RDP client application 146 running in the image forming apparatus 1; and informs the application 211 of the obtained information. Using this function of the RDP server 212, it becomes possible to perform an operation regarding the application 211 using the operating unit of the image forming apparatus 1.

When the remote desktop function is enabled, the image-forming-apparatus communication module 213 provides a function that enables performing an operation regarding the application 211 by an operation to the hardware key operating unit 104b and that enables performing control of the hardware key operating unit 104b depending on an operating state of the application 211. The image-forming-apparatus communication module 213 stores therein the identifiers that are specified in the hardware key identification table. Thus, when the identifier is received from the image forming apparatus 1, the image-forming-apparatus communication module 213 identifies the hardware key that has been operated based on the received identifier.

Consider a case of performing control of the hardware key operating unit 104b depending on the operating state of the application 211. For example, consider a case of turning ON an LED of a start key. In that case, the image-forming-apparatus communication module 213 specifies the identifier indicating the hardware key to be controlled and issues a command to the image forming apparatus 1. With this function of the image-forming-apparatus communication module 213, when implementing the function of the application 211 from the image forming apparatus 1 by means of the remote desktop function, it becomes possible to make use of the key or LED installed in the hardware key operating unit 104b.

Figure 8:
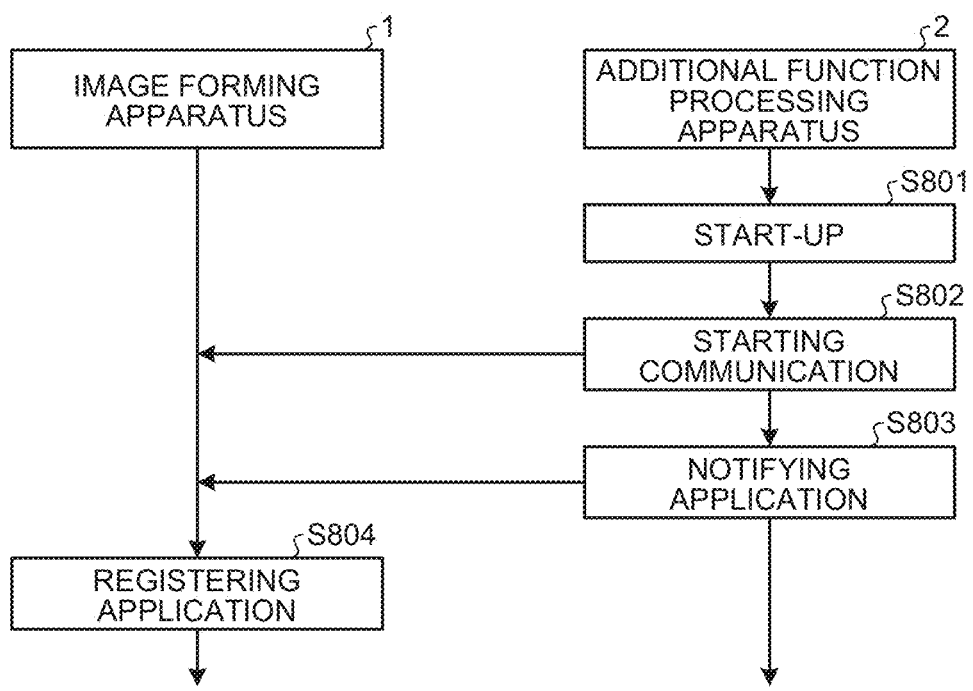
FIG. 8 is a sequence diagram illustrating an operation performed at the time of starting up the additional function processing apparatus according to the embodiment of the present invention.

As illustrated in FIG. 8, the application 211 that is installed in the additional function processing apparatus 2 is registered in the image forming apparatus 1 at the time of starting up the additional function processing apparatus 2, then it becomes possible to use the application 211 via the image forming apparatus 1. Explained below with reference to FIG. 8 is an operation performed at the time of starting up the additional function processing apparatus 2. As illustrated in FIG. 8, when the additional function processing apparatus 2 is started by switching the power ON (S801), the image-forming-apparatus communication module 213 starts communicating with the control services 151 of the image forming apparatus 1 (S802).

Upon starting the communication with the control services 151 of the image forming apparatus 1, the image-forming-apparatus communication module 213 notifies the image forming apparatus 1 of the application 211 installed in the additional function processing apparatus 2, that is, the image transfer client application 211a and the OCR application 211b (S803). In the image forming apparatus 1, upon receiving notification of the application from the additional function processing apparatus 2, the main control unit 110 stores the function of the notified application in a memory area, such as the RAM 20, to register that function (S804). Thereby, the operation is completed. As illustrated in FIG. 1, when a plurality of image forming apparatuses 1a to 1c is connected to a network, the additional function processing apparatus 2 performs an operation as illustrated in FIG. 8 in tandem with each of those image forming apparatuses 1a to 1c.

By performing the operation as illustrated in FIG. 8, the function implemented in the additional function processing apparatus 2 is registered in the image forming apparatus 1 and is displayed in a selectable manner on the display panel 104a of the image forming apparatus 1. FIG. 9 illustrates an example of a function selection screen that is displayed on the display panel 104a of the image forming apparatus 1. As illustrated in FIG. 9, in the function selection screen of the image forming apparatus 1 according to the present embodiment, various buttons are displayed that enable selection of a function such as "copy", "scan", "fax", "print", "document box", "scan-to-cloud", and "cloud-to-print". The function selection screen is displayed under the control of the main control unit 110. That is, the control services 151 running in the main control unit 110 serve as a function selection screen displaying unit.

Of the functions illustrated in FIG. 1; "copy", "scan", "fax", "print", and "document box" are implemented by the applications installed in the image forming apparatus 1 as illustrated in FIG. 4. On the other hand, the functions "scan-to-cloud" and "cloud-to-print" are implemented by the image transfer client application 211a installed in the additional function processing apparatus 2.

In this way, the image forming apparatus 1 is not limited to a configuration in which applications and functions are registered while being associated with each other on a one-to-one basis. Rather, when a single application implements a plurality of functions, the image forming apparatus 1 registers all those functions. Meanwhile, the OCR application 211b is not used in a stand-alone manner, but is used as an option of the "scan" function or the "scan-to-cloud" function. Thus, the OCR application 211b is not registered as a stand-alone function, but is registered as an optional setting function of the "scan" function or the "scan-to-cloud" function.

FIG. 10 is a diagram illustrating an example of a table (hereinafter, referred to as "application registration table") in which the following pieces of information are stored while being associated with each other: a registered-application name indicating the registered function as illustrated in FIG. 9; a running application indicating the application which is run when the particular function is selected to be implemented; and a hardware-key-operation notification destination indicating a destination to which a particular hardware key operation is notified. As illustrated in FIG. 10, when the "copy" function is selected, the copying application 141 is run in the image forming apparatus 1. At that time, if the hardware key operating unit 104b is operated, then contents of this operation are notified to the copying application 141.

When the "scan-to-cloud" function is selected, the RDP client application 146 is run in the image forming apparatus 1. At that time, if the hardware key operating unit 104b is operated, then contents of this operation are notified to the additional function processing apparatus 2 via the control services 151. Meanwhile, the application registration table illustrated in FIG. 10 is generated by performing the operation at S804 illustrated in FIG. 8. That is, the main control unit 110 serves as a remote function-storing unit to store the application registration table in a memory medium.

In the image forming apparatus 1 and the additional function processing apparatus 2 described above, a key point of the present embodiment relates to controlling the hardware key operating unit 104b when the remote desktop function is enabled, that is, when the RDP client application 146 is running in the image forming apparatus 1. Explained below is an operation performed regarding that key point.

Figure 11:
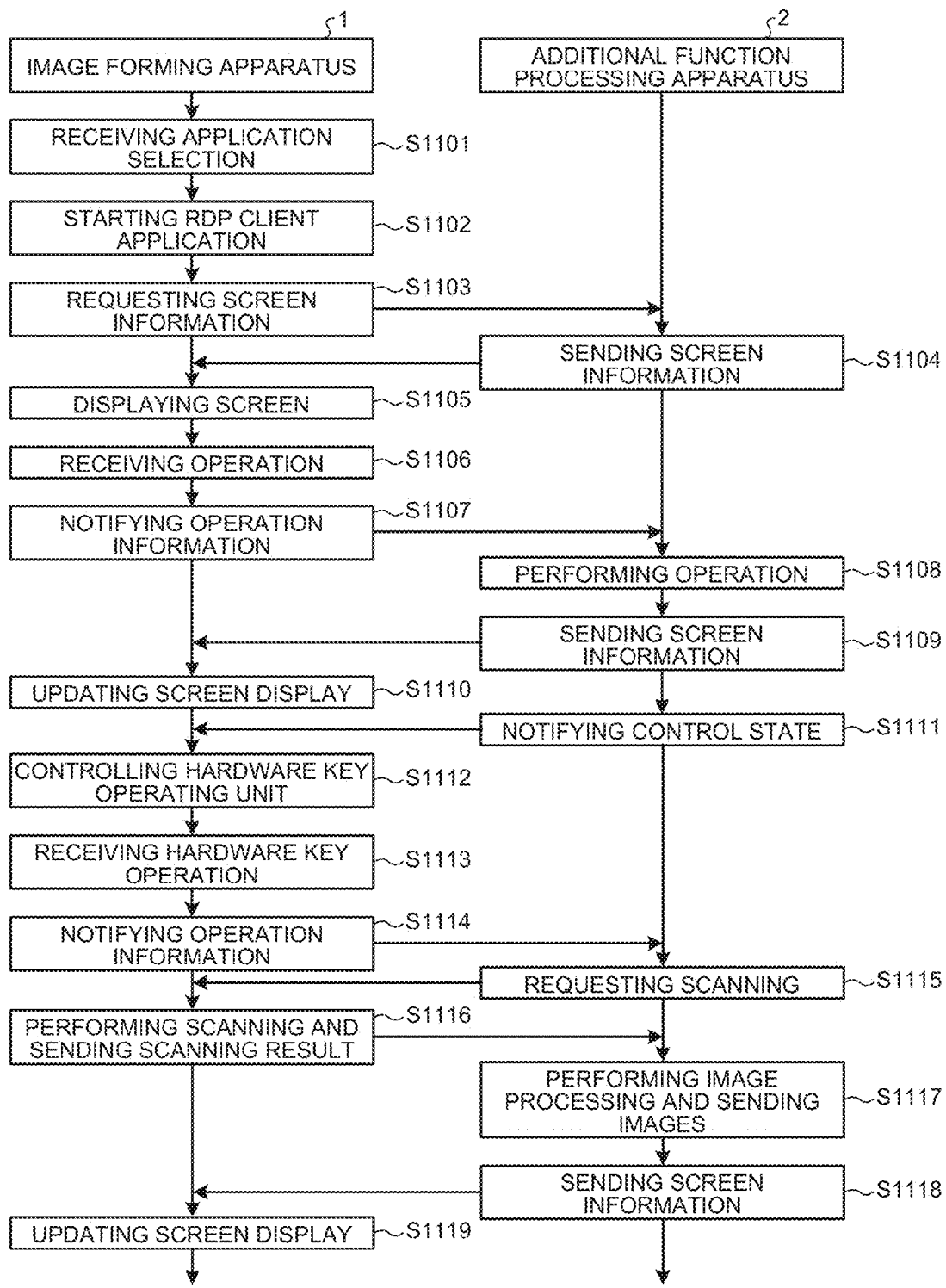
FIG. 11 is a sequence diagram illustrating an operation in the system according to the embodiment of the present invention.

FIG. 11 is a sequence diagram for explaining an example of an operation performed when a function implemented in the additional function processing apparatus 2 is selected in the image forming apparatus 1. As illustrated in FIG. 11, in the image forming apparatus 1, when selection of a function, such as the "scan-to-cloud" function or the "cloud-to-scan" function, that is implemented in the additional function processing apparatus 2 is received by the main control unit 110 (S1101), the main control unit 110 starts the RDP client application 146 explained with reference to FIG. 4 (S1102). Herein, explanation is given for an example in which the "scan-to-cloud" function is selected. Upon being started, the RDP client application 146 requests screen information from the RDP server 212 of the additional function processing apparatus 2 via the network (S1103).

A request for the screen information at S1103 also contains information to specify an application that corresponds to the function selected at S1101. Based on the information explained with reference to FIG. 10, the main control unit 110 identifies the application that corresponds to the function selected at S1101. In the additional function processing apparatus 2, the RDP server 212 receives the request for the screen information from the image forming apparatus 1, and sends the screen information of the GUI of the specified application to the RDP client application 146 (S1104). Thus, the RDP server 212 serves as a remote display-providing unit. If the specified application is not yet started, an operation performed at S1104 also includes starting that application. Thus, at S1103, the RDP client application 146 also serves as a remote function-starting unit.

The RDP client application 146 receives screen information from the RDP server 212, and instructs the operation display control unit 140 to display the screen information on the display screen of the display panel 104a (S1105). Thus, the RDP client application 146 serves as a remote function-displaying unit. This enables the user to check the screen displayed on the display panel 104a and to perform a touch operation to operate the application 211, which is installed in the additional function processing apparatus 2, via the image forming apparatus 1. Herein, operations for various settings of the "scan-to-cloud" function are performed.

When the operation with respect to the GUI displayed on the display panel 104a is received by the RDP client application 146 of the main control unit 110 via the operation display control unit 140 (S1106), the RDP client application 146 notifies the RDP server 212 of the additional function processing apparatus 2 of information on the received operation (S1107). Thus, the RDP client application 146 serves as a remote operating unit. Upon receiving the notification of the operation information from the image forming apparatus 1, the RDP server 212 performs operation control on the application 211 according to the informed operation information (S1108). Thus, the RDP server 212 serves as a remote operation-receiving unit. Herein, the application 211 is informed of a parameter that is set on the GUI, which is displayed on the display panel 104a of the image forming apparatus 1, and that parameter is stored in the application 211.

As a result of the operation at S1108, if there is a change in display of the GUI of the application 211; then the RDP server 212 sends information on the changed screen of the GUI of the application 211 that has been operated to the RDP client application 146 of the image forming apparatus 1 (S1109). Then, in the image forming apparatus 1, the RDP client application 146 updates the display on the display panel 104a according to the screen information received from the RDP server 212 (S1110).

Moreover, in response to change in the operation state of the application 211 as a result of the operation at S1108, if there arises a need to perform control of the hardware key operating unit 104b such as turning ON an LED installed in the hardware key operating unit 104b of the image forming apparatus 1, then the image-forming-apparatus communication module 213 notifies the main control unit 110 of the image forming apparatus 1 about the control state (S1111). Thus, the image-forming-apparatus communication module 213 serves as a control information sending unit to send control information to control the mechanically-configured operating unit. Notification sent at S1111 contains an identifier explained with reference to FIG. 5. With that identifier, a control target, such as an LED, is identified.

In the image forming apparatus 1 that receives notification of the control state from the image-forming-apparatus communication module 213, the control services 151 running in the main control unit 110 control a device in the hardware key operating unit 104b identified by the identifier (S1112). Thus, the control services 151 running in the main control unit 110 serve as a mechanical operation control unit. As a result, in the hardware key operating unit 104b, the LED indicating that effect of the start key has been enabled is turned ON. That is, even for the function implemented by the additional function processing apparatus 2, a user interface can be realized by the function of the hardware key operating unit 104b. This makes it possible to enhance user-friendliness.

In such a state, if a key installed in the hardware key operating unit 104b such as the start key is pressed, the main control unit 110 accepts this operation with respect to the hardware key operating unit 104b (S1113), and notifies the image-forming-apparatus communication module 213 of the additional function processing apparatus 2 of contents of that operation (S1114). Thus, the control services 151 running in the main control unit 110 serve as a mechanical operation detecting unit. Notification at S1114 contains the identifier explained with reference to FIG. 5. With that identifier, the hardware key that has been operated is identified. Herein, explanation is given for an example in which the start key is pressed, which instructs start of scanning in the "scan-to-cloud" function.

Upon receiving notification of information on the operation of the hardware key operating unit 104b from the image forming apparatus 1, the image-forming-apparatus communication module 213 recognizes that the hardware key is pressed based on the abovementioned identifier, and notifies the application 211 of the same. As a result, the application 211 becomes a standby state to perform the "scan-to-cloud" function. Then, to the image forming apparatus 1, the image-forming-apparatus communication module 213 issues a scan execution request to generate, by means of scanning, image information that is to be stored in a file server provided by cloud service (S1115).

In the image forming apparatus 1 that receives the scan execution request from the additional function processing apparatus 2, the main control unit 110 performs scanning by controlling the units and sends the resultant image information to the image-forming-apparatus communication module 213 of the additional function processing apparatus 2 (S1116). Upon receiving the image information that is generated by means of scanning in the image forming apparatus 1, the additional function processing apparatus 2 inputs the received image information to the application 211. Then, on the input image information, the application 211 performs image processing according to the set parameter that is set by the operation at S1107 and S1108, and sends the processed image information to the file server provided by the cloud service (S1117).

As a result of the operation performed at S1117, when there occurs a change in the GUI, the RDP server 212 sends the screen information to the RDP client application 146 of the image forming apparatus 1 (S1118). Consequently, in the image forming apparatus 1, the RDP client application 146 updates the display on the display panel 104a according to the screen information received from the RDP server 212 (S1119). Thereby, the operation of the "scan-to-cloud" function for one time is completed.

As a result of the above operation, a function concerning the key point of the present embodiment is fulfilled in which the function that is implemented in the additional function processing apparatus 2 is controlled via the hardware key operating unit 104b that is connected to the image forming apparatus 1; and the hardware key operating unit 104b is controlled according to the implementation state of the function of the additional function processing apparatus 2. Explained below in detail with reference to FIG. 12 are an operation performed by the main control unit 110 when the hardware key operating unit 104b of the image forming apparatus 1 is operated at S1112 illustrated in FIG. 11.

Figure 12:
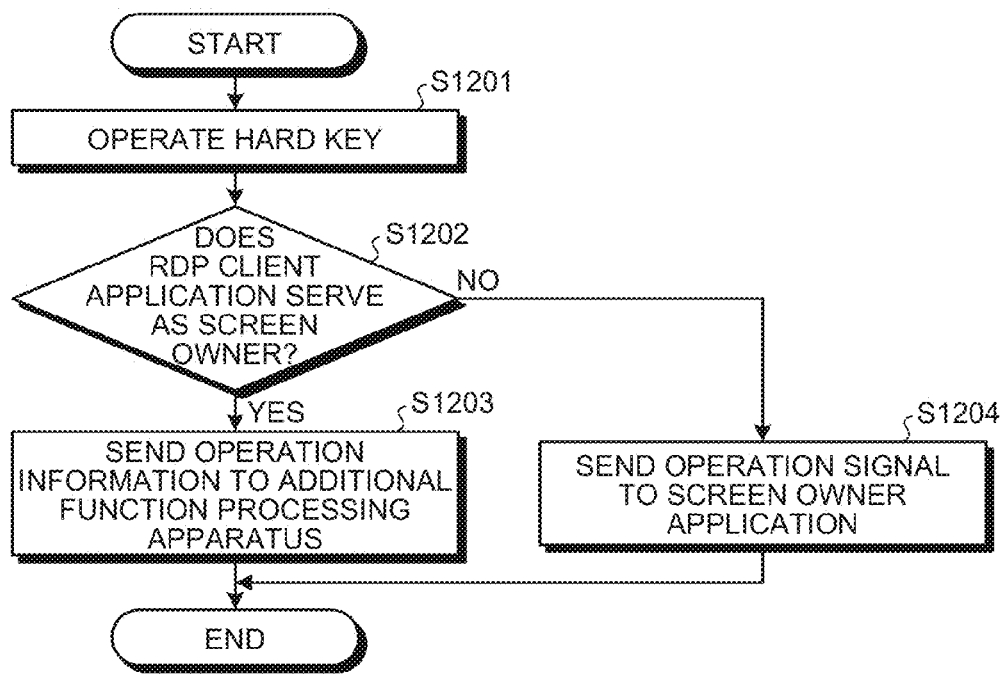
FIG. 12 is a flowchart illustrating an operation performed in the image forming apparatus according to the embodiment of the present invention.

As illustrated in FIG. 12, the hardware key operating unit 104b is operated (S1201), and the main control unit 110 detects, via the operation display control unit 140, an operation on the hardware key operating unit 104b. Then, the main control unit 110 checks an owner application that is being currently displayed on the display panel 104a, in other words, checks which application has its GUI currently displayed on the display panel 104a. That is, the main control unit 110 checks the screen owner of the display panel 104a, in other words, checks what a screen displayed on the display panel 104a is used for (S1202).

As explained with reference to FIG. 4, the main control unit 110 includes a plurality of applications. Thus, the application that corresponds to the function selected by the user serves as the screen owner, and the GUI of that application is displayed on the display panel 104a. Thus, the main control unit 110 can check which application is being currently selected as the screen owner.

As a result of checking at S1202, if the RDP client application 146 is found to be the screen owner (YES at S1202), the main control unit 110 sends a hardware key operation signal, indicating that the hardware key is operated, to the additional function processing apparatus 2 based on the table explained with reference to FIG. 10 (S1203). Thereby, the operation is completed. Meanwhile, operation information sent at S1203 contains the identifier explained with reference to FIG. 5.

On the other hand, as a result of the checking at S1202, if an application other than the RDP client application 146 is found to be the screen owner (NO at S1202), the main control unit 110 sends the operation signal to the application, that is the screen owner, based on the table explained with reference to FIG. 10 (S1204). Thereby, the operation is completed. With this operation performed by the main control unit 110, when the remote desktop function is enabled, the operation information of the hardware key operating unit 104b is sent to the additional function processing apparatus 2; and when an application that can be run only by the image forming apparatus 1 is selected, the operation information of the hardware key operating unit 104b is sent to that application.

Figure 13:
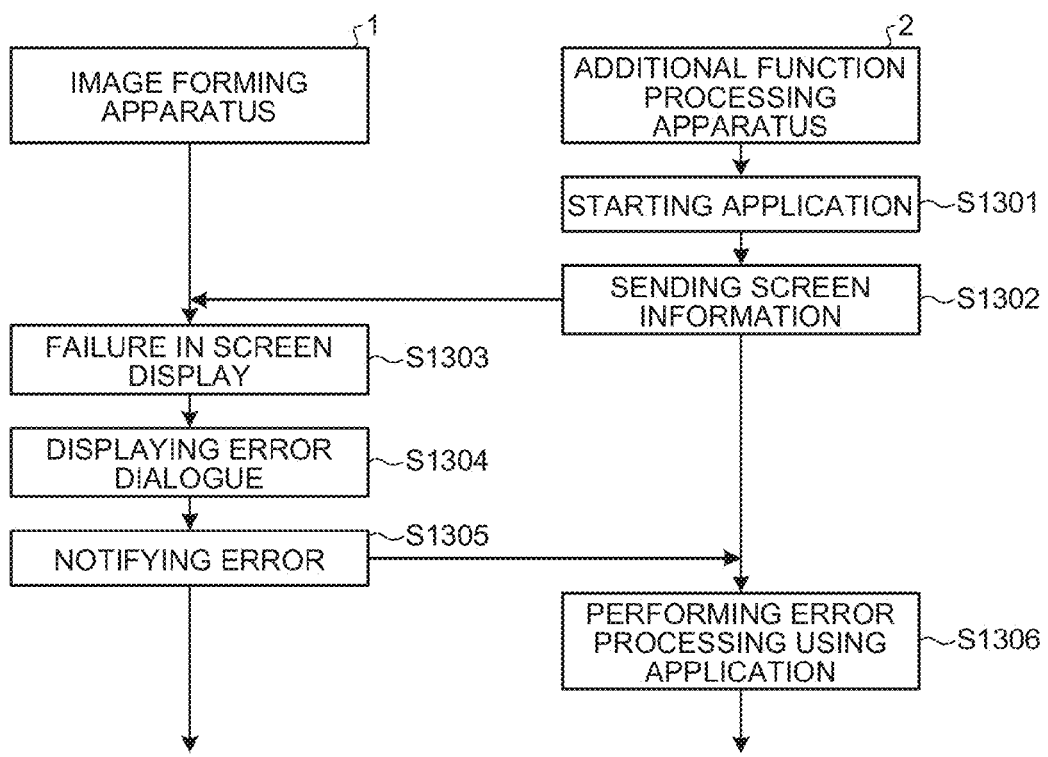
FIG. 13 is a sequence diagram illustrating an operation in the system according to the embodiment of the present invention.

Explained below with reference to FIG. 13 is an operation performed when there is a failure in displaying a screen using the remote desktop function. In a case of a system in which the commonly-used remote desktop function is used, the application 211 installed on the RDP server 212 cannot determine whether or not a screen is being correctly displayed in the image forming apparatus 1 in which the RDP client application 146 is running.

More specifically, the application 211 installed on the RDP server 212 does not recognize whether the GUI is displayed on a display device connected to the additional function processing apparatus 2 or on the display panel 104a of the image forming apparatus 1 via the RDP server 212 and the RDP client application 146. Therefore, irrespective of whether an error occurs in the remote desktop function, the application 211 runs under the assumption that the GUI is displayed in a correct manner. With regards to such an issue, the image-forming-apparatus communication module 213 according to the present embodiment includes a unit to notify the application 211 of when a screen is not correctly displayed when the remote desktop function is used.

As illustrated in FIG. 13, an application starts in the image forming apparatus 1 (S1301), and the RDP server 212 sends screen information in response to a request for image information issued by the RDP client application 146 (S1302). Then, as described above, the RDP client application 146 of the image forming apparatus 1 performs an operation of displaying a screen. Thereat, if the RDP client application 146 detects failure of the operation of displaying the screen (S1303), the main control unit 110 displays an error dialogue on the display panel 104a (S1304). Herein, besides displaying an error dialogue on the display panel 104a, an operation performed at S1304 may also include an operation of turning ON an LED installed in the hardware key operating unit 104b.

Then, the main control unit 110 performs an error notification indicating the failure of the operation of displaying the screen to the image-forming-apparatus communication module 213 of the additional function processing apparatus 2 (S1305). Thus, the control services 151 running in the main control unit 110 serve as an error information sending unit. Upon receiving the error notification from the image forming apparatus 1, the image-forming-apparatus communication module 213 notifies the application 211 of the error. Thus, the image-forming-apparatus communication module 213 serves as an error notifying unit. Consequently, the application 211 performs predetermined error processing corresponding to a screen display error (S1306). As a result of performing such an operation, the application 211 becomes able to recognize an error in displaying the screen by the remote desktop function, and becomes able to perform error processing corresponding to the errors.

As described above, in the image forming apparatus 1 according to the present embodiment, when the hardware key operating unit 104b is operated, the main control unit 110 recognizes the screen owner of the display panel 104a. If the main control unit 110 determines that the application providing the remote desktop function is the screen owner, that is, if the RDP client application 146 according to the present embodiment is the screen owner, then the main control unit 110 sends operation information to the image forming apparatus 1. The operation information contains an identifier that is set in common among the image forming apparatus 1 and the additional function processing apparatus 2. With such a configuration, the function of the application 211 that is installed in the additional function processing apparatus 2 can be implemented by operating the hardware key operating unit 104b that is connected to the image forming apparatus 1.

Moreover, in the additional function processing apparatus 2 according to the present embodiment, the image-forming-apparatus communication module 213 generates a control signal to control the hardware key operating unit 104b according to the operating state of the application 211, and sends the control signal to the image forming apparatus 1. The control signal contains the identifier that is set in common among the image forming apparatus 1 and the additional function processing apparatus 2. With such a configuration, according to the operating state of the application 211 installed in the additional function processing apparatus 2, it becomes possible to control the hardware key operating unit 104b connected to the image forming apparatus 1 and to perform an operation such as turning ON the LED.

In this way, in a system according to the present embodiment in which the image forming apparatus 1 and the additional function processing apparatus 2 operate in tandem as an image processing apparatus and an information processing apparatus, respectively, even when operating an operating unit connected to the image processing apparatus, all functions of the operating unit can be used when controlling the function performed in tandem with the information processing apparatus.

Meanwhile, in the present embodiment, as illustrated in FIG. 1, explanation is given for the example in which a single additional function processing apparatus 2 has a plurality of image forming apparatuses 1 connected thereto via the network. However, this is not the only possible case. Alternatively, the additional function processing apparatus 2 and the image forming apparatus 1 can be paired on a one-to-one basis. Even in this case, by adopting the configuration according to the present embodiment, it becomes possible to use the operating unit that is connected to the image processing apparatus. This eliminates a need to manufacture an operating unit, which is to be connected to the additional function processing apparatus, in accordance with the image processing apparatuses.

In the present embodiment, the remote desktop protocol (RDP) is explained to be used to operate the additional function processing apparatus 2 from the image forming apparatus 1. However, any other technology such as virtual network computing (VNC) that provides the remote desktop function can also be used.

In this way, according to an embodiment of the present invention, in a system in which an image processing apparatus and an information processing apparatus operate in tandem, all functions of the operating unit can be used even when controlling the function implemented by the image processing apparatus and the information processing apparatus in tandem and using an operating unit connected to the image processing apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system comprising:
an image forming apparatus; and
an information processing apparatus,
the image forming apparatus including
    a plurality of mechanically-configured operating units,
    a storage unit to store identifiers, each indicating a respective one of the mechanically-configured operating units,
    a requesting unit configured to request execution of one of a plurality of applications installed in the information processing apparatus,
    a notification unit configured to notify that a first operating unit, from among the plurality of mechanically-configured operating units, becomes usable,
    the image forming apparatus being configured such that the first operating unit is an operating unit that is indicated by an identifier sent from the information processing apparatus depending on a state of the one of the plurality of applications, execution of which is requested by the requesting unit,
    the image forming apparatus being configured such that the notifying includes changing a state of the first operating unit and the notifying is performed based on the identifier sent from the information processing apparatus,
    an accepting unit configured to accept input to the first operating unit notified by the notification unit, and
    a sending unit configured to send an identifier indicating the first operating unit, the input to which is accepted by the accepting unit,
the information processing apparatus including
    a storing unit to store a plurality of applications,
    a processing unit configured to execute processing of one of the plurality of applications in response to a request sent from the image forming apparatus, and
    a sending unit configured to send an identifier of a mechanically-configured operating unit that is useable depending on a state of the one of the plurality of applications executed by the processing unit, and
wherein the processing unit is configured such that the identifier sent from the image forming apparatus determines the one of the plurality of applications executed by the processing unit.

2. The image processing system of claim 1, wherein
the requesting unit is configured to request an operation screen of the one of the plurality of applications from the information processing apparatus,
the image forming apparatus further comprises a displaying unit configured to display the operation screen sent from the information processing apparatus, and
the sending unit of the information processing apparatus is configured to send the operation screen of the one of the plurality of applications requested from the image forming apparatus.

3. The image processing system of claim 1, wherein
the displaying unit is configured to display an error screen when the displaying unit fails to display the operation screen of the one of the plurality of applications sent from the information processing apparatus,
the sending unit of the image forming apparatus is configured to send an error notification to the information processing apparatus, and the processing unit is configured to execute error processing of the one of the plurality of applications.

4. An image processing method for an image processing system including an image forming apparatus and an information processing apparatus, the image processing method comprising:
- storing identifiers at the image forming apparatus, each indicating a respective one of a plurality of mechanically-configured operating units;
- requesting execution of one of a plurality of applications installed in the information processing apparatus;
- issuing a notification notifying that first operating unit, from among the plurality of mechanically-configured operating units, becomes usable,
- the first operating unit being an operating unit that is indicated by an identifier sent from the information processing apparatus depending on a state of the one of the plurality of applications, execution of which is requested by the requesting unit,
- the notifying including changing a state of the first operating unit,
- the notifying being performed based on the identifier sent from the information processing apparatus;
- accepting input to the first operating unit notified by the notification unit;
- sending an identifier indicating the first operating unit, the input to which is accepted by the accepting unit;
- storing a plurality of applications at the information processing apparatus;
- executing processing of one of the plurality of applications in response to a request sent from the image forming apparatus; and
- sending an identifier of a mechanically-configured operating unit that is useable depending on a state of the one of the plurality of applications executed, wherein the identifier sent from the image forming apparatus determines the one of the plurality of applications executed by the processing unit.

5. The image processing system method of claim 4, further comprising:
- requesting an operation screen of the one of the plurality of applications from the information processing apparatus;
- displaying, at the image forming apparatus, the operation screen sent from the information processing apparatus; and
- sending the operation screen of the one of the plurality of applications requested from the image forming apparatus.

6. The image processing system method of claim 4, further comprising:
- displaying an error screen when the displaying fails to display the operation screen of the one of the plurality of applications sent from the information processing apparatus;
- sending an error notification to the information processing apparatus; and
- executing error processing of the one of the plurality of applications.

* * * * *